Sept. 1, 1925.
F. HAITHWAITE
1,552,146
AMUSEMENT APPARATUS OR ROUNDABOUT
Filed Dec. 3, 1924
2 Sheets-Sheet 2
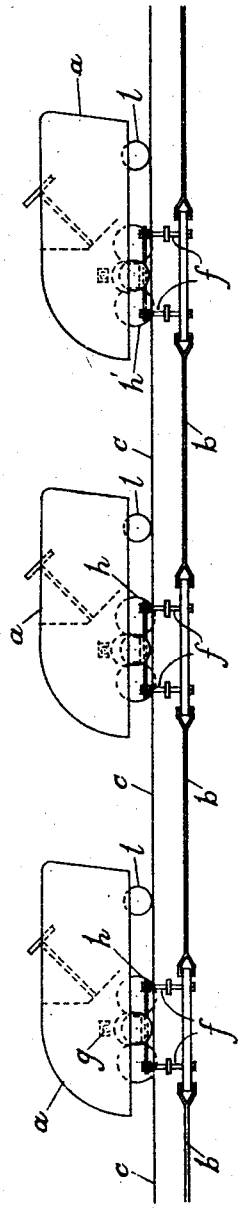
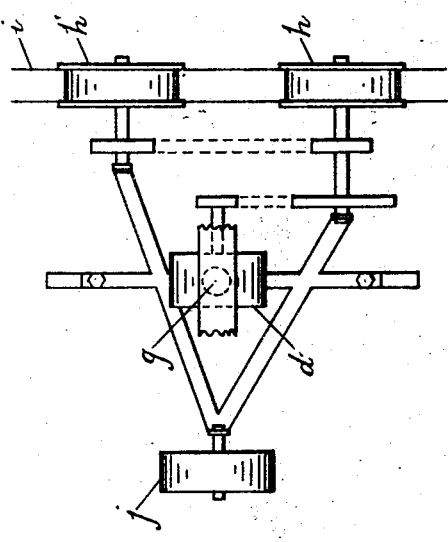
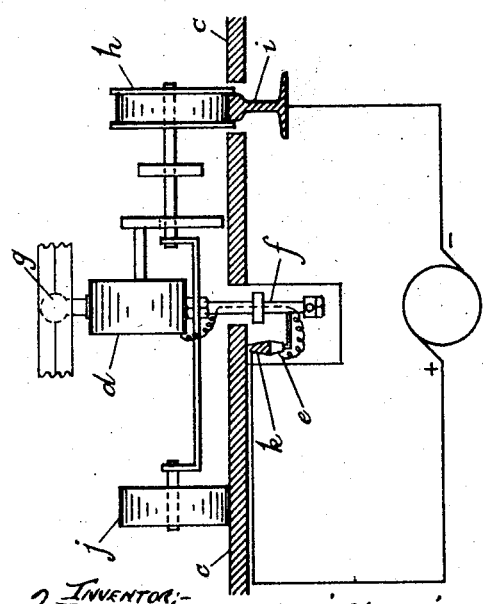

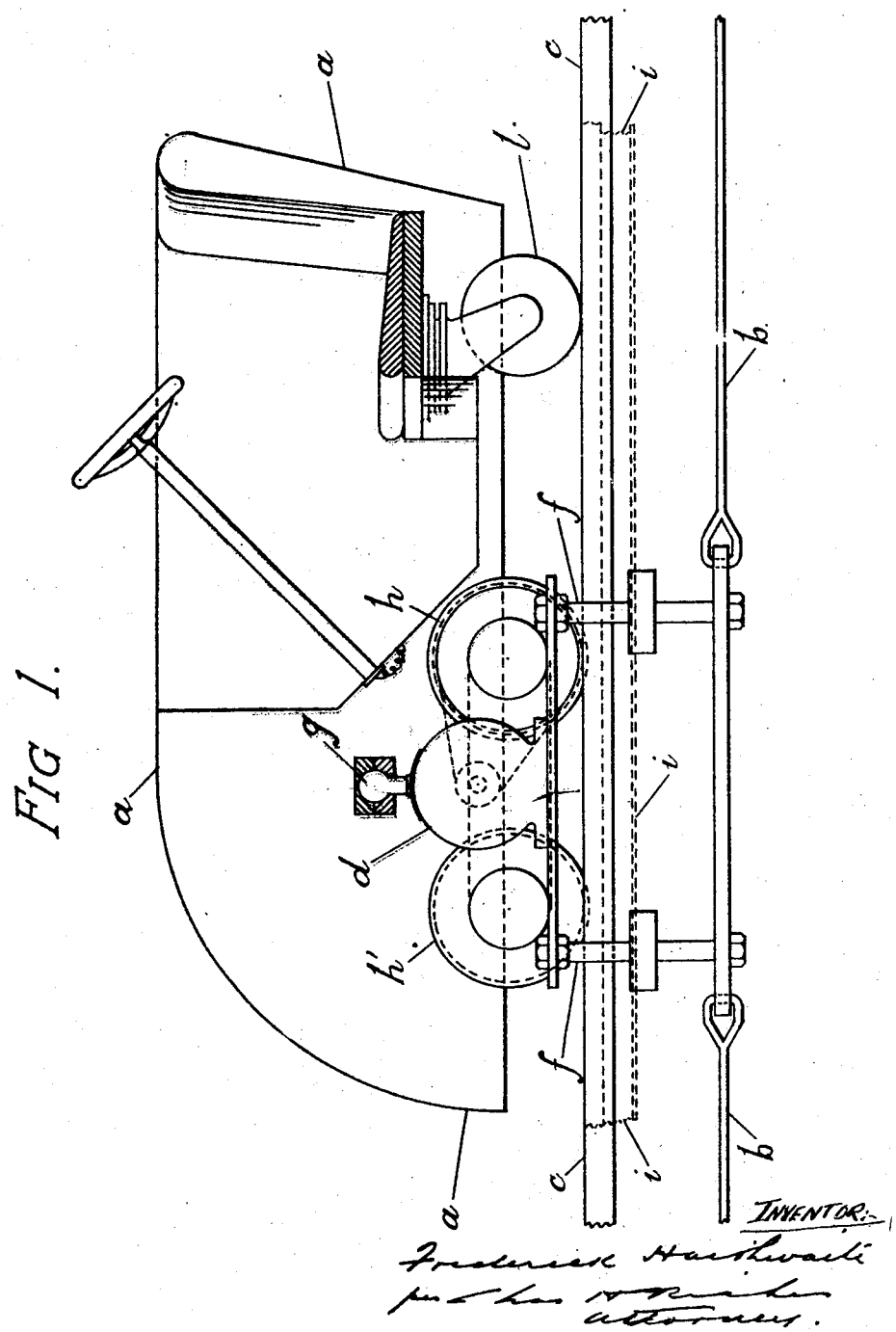

Patented Sept. 1, 1925.

1,552,146

UNITED STATES PATENT OFFICE.

FREDERICK HAITHWAITE, OF LEEDS, ENGLAND.

AMUSEMENT APPARATUS OR ROUNDABOUT.

Application filed December 3, 1924. Serial No. 753,534.

*To all whom it may concern:*

Be it known that I, FREDERICK HAITHWAITE, of Bramley, in the city of Leeds, in the county of Yorkshire, England, a British subject, have invented certain new and useful Improvements in Amusement Apparatus or Roundabouts; and I hereby declare that the following is a full, clear, and exact description of the same.

My invention relates to an amusement apparatus or roundabout comprising a path or track and a series of passenger carrying vehicles or cars in which each vehicle or car consists of a superstructure or car body and an undercarriage with which the car body has a swivel or universal connection for unrestricted rotary motion. The several cars or vehicles in each series are coupled together at fixed or predetermined distances apart between said swivel connections and the separation of the cars by such distance is sufficient to permit of the unimpeded revolution of each car about its rotational axis independently of the rotation of each or any of the remaining cars of the series, so that when an endless and/or undulating path or track is employed each vehicle or car body will be automatically rotated when passing over the curved or inclined portions of the track. Each vehicle may be either mechanically or electrically driven and in the latter case the current is preferably collected from beneath the platform or track and conducted by electrical connections controlled from a central or distant station.

In order that the invention may be clearly understood and readily carried into effect, the same will now be more fully described with reference to the accompanying drawings in which:—

Figure 1 is a sectional side elevation of a car embodying the invention,

Figure 2 is a diagrammatical view of three cars connected together at given distances according to the invention, Figure 3 is an end elevation of the undercarriage showing the electrical connections, Figure 4 is a plan view of Figure 3.

Referring now to the drawings, $a$ represents the body of the car which is rotatably connected to an endless flexible cable or wire rope $b$ disposed below the undulating platform or track $c$ over which the vehicles are traversed whilst the current for driving the motors $d$ of each vehicle is collected from beneath the platform $c$ and conducted through suitable electrical connections $e$ see Figure 3 mounted beneath the platform and adapted to be controlled from a central or distant source of supply. The undercarriage or framework of each vehicle or car has a vertically disposed member or members $f$ carrying the motor $d$ which is connected by a swivel connection $g$ to the body of the car $a$ so as to permit of the vehicle or car being swung or moved through a complete circle at predetermined points of its traverse around the platform or track $c$, the wheels or runners associated with each vehicle or car being also so mounted and arranged that the swinging or local cyclic movements will not in anyways be impeded or interfered with. Thus, the wheels or runners, of which there may be three to each vehicle or car, consist of two flanged wheels or pulleys $h$, $h^1$ adapted to run over or on an endless track or rail $i$ with its upper surface substantially flush with the platform, and a third idle or loose pulley or wheel $j$ running parallel to the two flanged wheels or pulleys $h$, $h^1$ mounted on the rail $i$. One of the latter wheels or pulleys $h$ is geared up to the motor $d$ preferably arranged at a point centrally disposed between the three wheels by means of chain and sprocket wheels or other suitable driving means, whilst the other of the two wheels or pulleys may be driven from the former by chain or similar connection. Two castor wheels $l$ are provided to support the rear part of the vehicle or car. The parts and connections of the undercarriage will be so constructed and arranged that the centre of gravity of the whole structure will lie directly central to the vehicle or car and as near the platform or track as practicable. Associated with the electrical connections $e$ underneath or below the track there is one or more copper or like collecting rails, bars or their equivalent $k$ having spring plates or brushes capable of being moved into and out of contact with the collecting rail $k$ as and when required. The platform or track $c$ over or along which the vehicles or cars are traversed may consist of inclined and horizontal surfaces or portions arranged in any desired sequence or order, and of such dimensions or lengths as will permit of the cars being swung around or rotated about their swivel or universal connections with safety and without undue shock or sudden impulses of stopping and starting, without risk of the cars colliding or without requiring the use of buffers and also without undue strain on the connections.

Having thus fully described my invention, what I claim as new and desire to secure by Letters Patent is:

1. In an amusement apparatus or roundabout, a passenger vehicle comprising a superstructure and an undercarriage having a vertically disposed member and a motor carried thereby with which the superstructure has a swivel connection for unrestricted rotary motion, means for coupling together several vehicles in series at predetermined distances apart between their swivelling points of connection, and a track upon which said cars travel.

2. In an amusement apparatus or roundabout, a passenger vehicle comprising an undulating platform or track, electrical conductors beneath the platform controlled from a central or distant source of supply, a passenger vehicle comprising an undercarriage having a vertically disposed member, a motor carried thereby, a car body having a swivel connection with the motor whereby it can revolve around its swivel axis at predetermined points of its traverse and wheels associated with each vehicle so mounted and arranged that the cyclic movements of the superstructure will be unimpeded.

3. The amusement apparatus or roundabout according to claim 2 in which each vehicle is provided with three wheels two of which are flanged and adapted to run on an endless track and the third is a loose wheel running parallel to the two flanged wheels.

4. An amusement apparatus according to claim 2 in which each vehicle is provided with three wheels two of which are flanged and adapted to run on an endless track and the third is a loose wheel running parallel to the two flanged wheels, one of the flanged wheels being geared to the motor and the other flanged wheel driven from the first mentioned one.

5. An amusement apparatus according to claim 2 in which each vehicle is provided with three wheels two of which are flanged and adapted to run on an endless track and the third is a loose wheel running parallel to the two flanged wheels, one of the flanged wheels being geared to the motor and the other flanged wheel driven from the first mentioned one, and two castor wheels supporting the rear part of the vehicle.

6. In an amusement apparatus or roundabout, a passenger vehicle comprising a superstructure and an undercarriage with which the superstructure has a swivel connection for unrestricted rotary motion, castor wheels supporting the superstructure beyond its swivel connection with the undercarriage, means for coupling together several vehicles in series at predetermined distances apart between their swivelling points of connection, and an undulating track upon which said cars travel, whereby each vehicle will be automatically rotated by passing over the curved or inclined portions of the track.

7. Amusement apparatus or roundabouts according to claim 1, in which each vehicle is driven by an electric motor, the current for which is collected from beneath the platform or track and conducted through suitable electrical connections beneath the platform and adapted to be controlled from a central or distant source of supply.

8. In an amusement apparatus or roundabout, a passenger vehicle comprising a superstructure and an under-carriage with which the superstructure has a swivel connection for unrestricted rotary motion, means for coupling together several vehicles in series at predetermined points apart between their swivelling points of connection, three wheels for the undercarriage, two of which may be flanged and adapted to run on an endless rail flush with the platform, one of said flanged wheels being geared to the motor and the other flanged wheel being driven from the former by chain or similar connections whilst the third wheel is an idle or loose pulley.

Dated at the city of Toronto, in the county of York and Province of Ontario, Dominion of Canada, this 29th day of November, 1924.

FREDERICK HAITHWAITE.